(12) United States Patent  (10) Patent No.: US 8,422,060 B2
Jahn et al.  (45) Date of Patent: Apr. 16, 2013

(54) DOCUMENT PATH MAPPING MECHANISM

(75) Inventors: Janeen Elizabeth Jahn, Lafayette, CO (US); Joseph Paul Gaertner, Lafayette, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 731 days.

(21) Appl. No.: 12/607,175

(22) Filed: Oct. 28, 2009

(65) Prior Publication Data

US 2011/0096357 A1  Apr. 28, 2011

(51) Int. Cl.
 *G06F 3/12* (2006.01)
(52) U.S. Cl.
 USPC ........ 358/1.15; 358/1.13; 358/1.18; 707/634; 707/755; 707/999.001; 710/8
(58) Field of Classification Search ................. 358/1.13, 358/1.15, 1.16; 710/8
 See application file for complete search history.

(56) References Cited

U.S. PATENT DOCUMENTS

| 8,059,290 | B2* | 11/2011 | Kuroshima | 358/1.13 |
| 2003/0202213 | A1* | 10/2003 | Saito | 358/1.18 |
| 2006/0039707 | A1 | 2/2006 | Mima | |
| 2006/0123229 | A1 | 6/2006 | Holloway et al. | |
| 2007/0136226 | A1 | 6/2007 | Irick | |
| 2008/0208794 | A1 | 8/2008 | Andriamananjara et al. | |
| 2008/0229428 | A1 | 9/2008 | Camiel | |
| 2008/0239369 | A1 | 10/2008 | Matsunaga et al. | |
| 2008/0266594 | A1 | 10/2008 | Lankreijer et al. | |
| 2009/0063718 | A1 | 3/2009 | Sekine et al. | |
| 2009/0100426 | A1 | 4/2009 | Morales et al. | |
| 2009/0279124 | A1* | 11/2009 | Liu et al. | 358/1.15 |
| 2010/0321715 | A1* | 12/2010 | Williams | 358/1.13 |

* cited by examiner

*Primary Examiner* — Benny Q Tieu
*Assistant Examiner* — Juan M Guillermety
(74) *Attorney, Agent, or Firm* — Blakely, Sokoloff, Taylor & Zafman LLP

(57) ABSTRACT

A method disclosed. The method includes receiving a Job Definition Format (JDF) job ticket indicating a document file to be printed is located in a JDF file path, mapping the JDF file path to a file path recognized at a print server, retrieving the document file and processing the document file for printing.

18 Claims, 4 Drawing Sheets

DOCUMENT PATH MAPPING MECHANISM

FIELD OF THE INVENTION

The invention relates to the field of printing systems, and in particular, to print job management.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is typically implemented at a print server to manage a print job from job entry and management through the complete printing process. More frequently, Job Definition Format (JDF) is being used to describe print jobs. JDF is an Extensible Markup Language (XML) based file format that describes a print job's characteristics (e.g., quantity, paper type, data files, etc.).

JDF features job tickets that describe data files that are included in a print job, as well as how the print job is to be printed. The job tickets may also include an element (e.g., FileSpecURL) that specifies an absolute path location of a document file. However, the specified path may not be included on the server where the printing software resides. As a result, a print system user may need to map the file path in the job ticket to a different file path on the server or mounted drive.

Such mapping may not be possible since the user often does not have access to the actual job ticket to be able to change the location. Further, the names of the mounted directories may change between different printing software servers and the user may want to customize each instance of the printing software.

Accordingly, a mechanism for mapping file paths from JDF to file paths within printing software is desired.

SUMMARY

In one embodiment, a method receiving a Job Definition Format (JDF) job ticket indicating a document file to be printed is located in a JDF file path, mapping the JDF file path to a file path recognized at a print server, retrieving the document file and processing the document file for printing.

Another embodiment discloses a print server including a printing software product. The printing software product includes a configuration file to map a document file path indicated in a Job Definition Format (JDF) job ticket to a file path recognized by the print server.

BRIEF DESCRIPTION OF THE DRAWINGS

A better understanding of the present invention can be obtained from the following detailed description in conjunction with the following drawings, in which.

DETAILED DESCRIPTION

A file path mapping mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
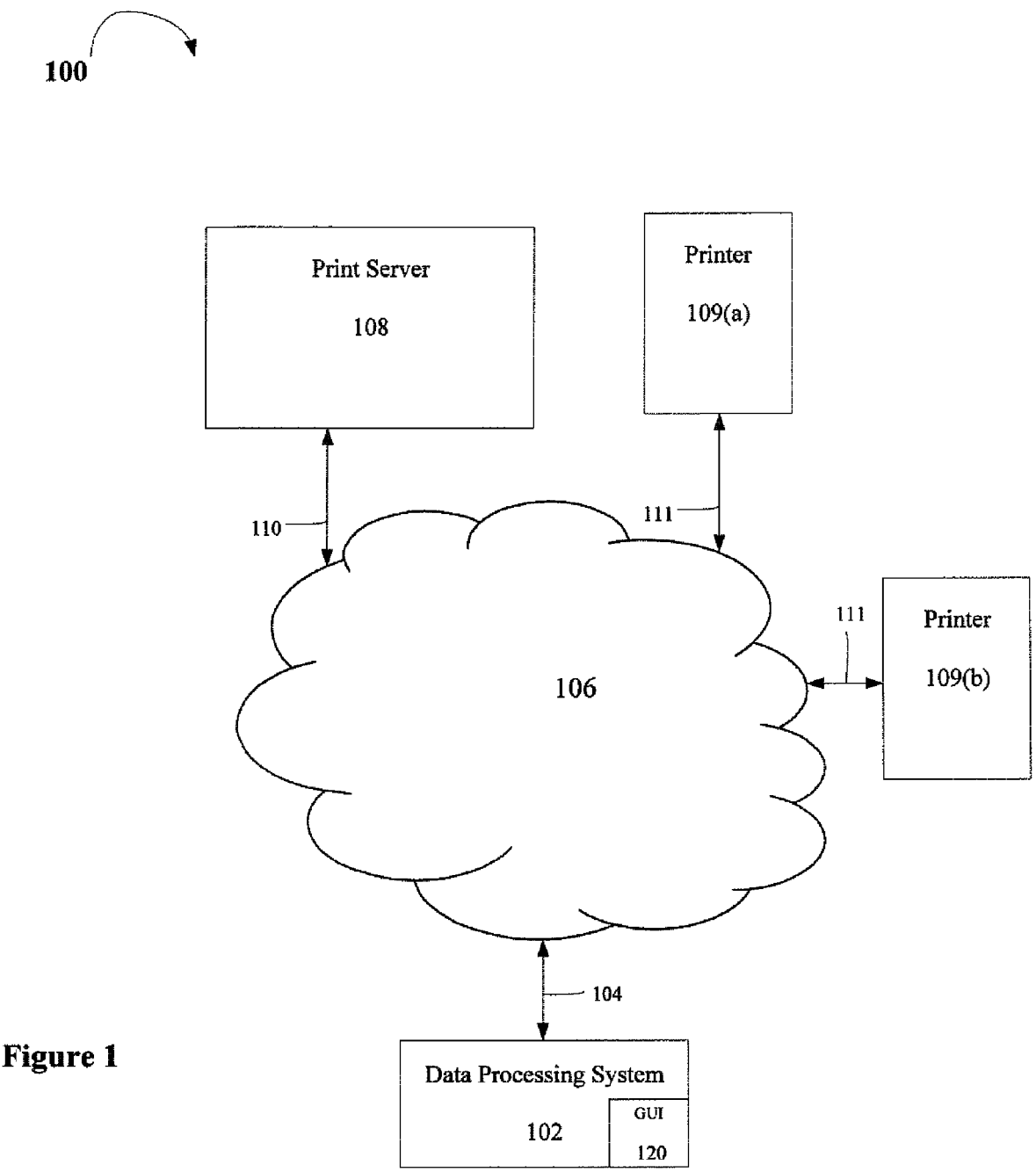
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select the desired print server 108 and submit requests for service requests to printer 109 via print server 108 over network 106. In a further embodiment, print server 108 includes a print queue for print jobs requested by remote data processing systems.

Although described as separate entities, other embodiments may include print server 108 being incorporated in one or more of the printers 109. However in other embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 between data processing system 102 and one or more of printers 109. In other embodiments, the printing software product manages printing of documents from multiple data processing systems 102 to the one or more printers 109.

According to one embodiment, the printing software product may be implemented using either InfoPrint Manager (IPM) or InfoPrint ProcessDirector (IPPD), although other types of printing software may be used instead. In a further embodiment, data processing system 102 includes a print application that interacts with the printing software product at printer server 108 to provide for efficient transmission of print jobs.

In one embodiment, the printing software product includes a graphical user interface (GUI) 120 that enables a system administrator (or operator) to interact with the printing software product and print application. In such an embodiment, the print application generates print jobs in JDF as job tickets. As discussed above, JDF job tickets may implement file directory paths that are different from those in the printing software product. Therefore in one embodiment, the printing software product features a process that maps file paths from JDF to file paths within the printing software product.

In such an embodiment, the printing software product provides a configuration file including mapping information. The mapping information is used by JDF during processing to allow the documents specified in JDF to point to a local path location, for example, and yet be mapped to a location that is visible to the printing software product without having to change the JDF.

In one embodiment, a sample configuration file is provided with the printing software product. In such an embodiment, the sample configuration file converts all Windows style file paths (e.g. "C:\") to Linux and AIX style file paths (e.g. "/"). In a further embodiment, the configuration file may be subsequently modified by an operator. For instance, the operator may modify the contents of the configuration file using GUI 120. Alternatively, the operator may use GUI to specify a new configuration file to be used. In one embodiment of network 100 printing, the printing software product attempts each mapping in the configuration file by making the specified mapping substitutions, until a file is found successfully.

According to one embodiment, the configuration file includes one mapping per line. In this embodiment, the client value is on the left and the host value is on the right, separated by a semi-colon. In a further embodiment, leading and trailing blanks are removed from each side. Each directory name includes at least one "\" or "/". In yet a further embodiment, directories are treated as complete directory names (e.g., a "\" or "/" is added to the end if not already present). In still a further embodiment, an asterisk (*) is allowed on the client side as a Drive Letter indicator to match any specified Drive.

Based on the above specified format, an exemplary sample configuration file provided with the printing software product would include the sample line (*:\;/), which will convert any Windows style directory to a linux/aix style directory. Table 1 shows an exemplary configuration file after modification, where the file includes direct mapping lines added by an operator, as well as the sample line.

TABLE 1

| | |
|---|---|
| C:\testfiles;/BankFiles/testfiles | Added by operator |
| C:\production\siteA;/BankFiles/prod | Added by operator |
| C:\production\siteA\test\;/BankFiles/test | Added by operator |
| *:\production\siteA\test\;/BankFiles/test | Added by operator |
| *:\;/ | Sample |

Figure 2:
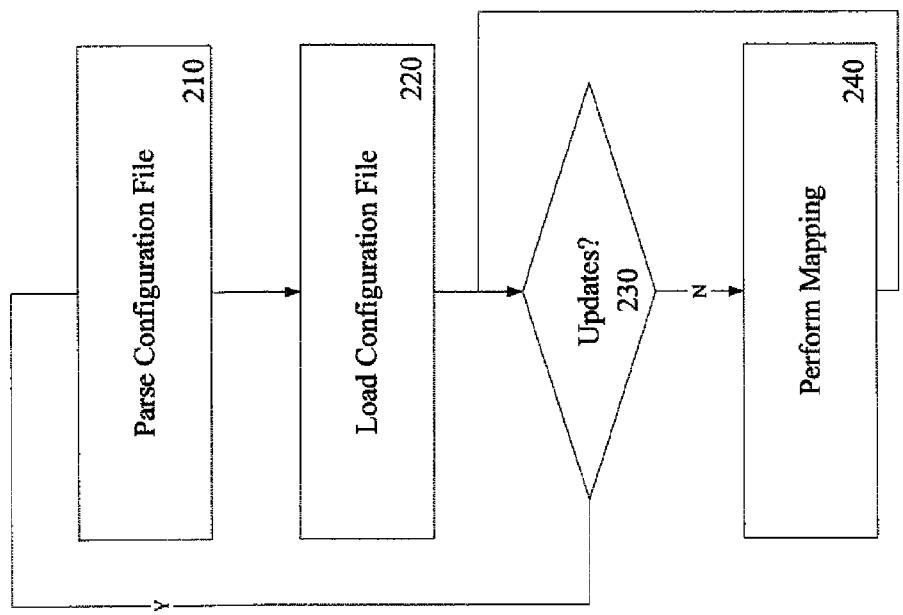
FIG. 2 is a flow diagram illustrating one embodiment of saving a configuration file.

FIG. 2 is a flow diagram illustrating one embodiment of loading a configuration file in the printing software product at print server 108. At processing block 210, the printing software product parses the configuration file. At processing block 220, the configuration file is loaded into memory. At decision block 230, it is determined whether updates are made to the configuration file sometime after the file is loaded into memory.

As discussed above, updates may include changes made via GUI 120 to the current file, or that a new/different file is specified. In one embodiment, a routine is performed at a predetermined interval (e.g., minute) to check for updates. If updates to the configuration are found, control is returned to processing blocks 210 and 220 where the configuration file is again parsed and the loaded version in the memory is refreshed. However if no updates are found the printing software product is ready to perform file path mapping, processing block 240.

Figure 3:
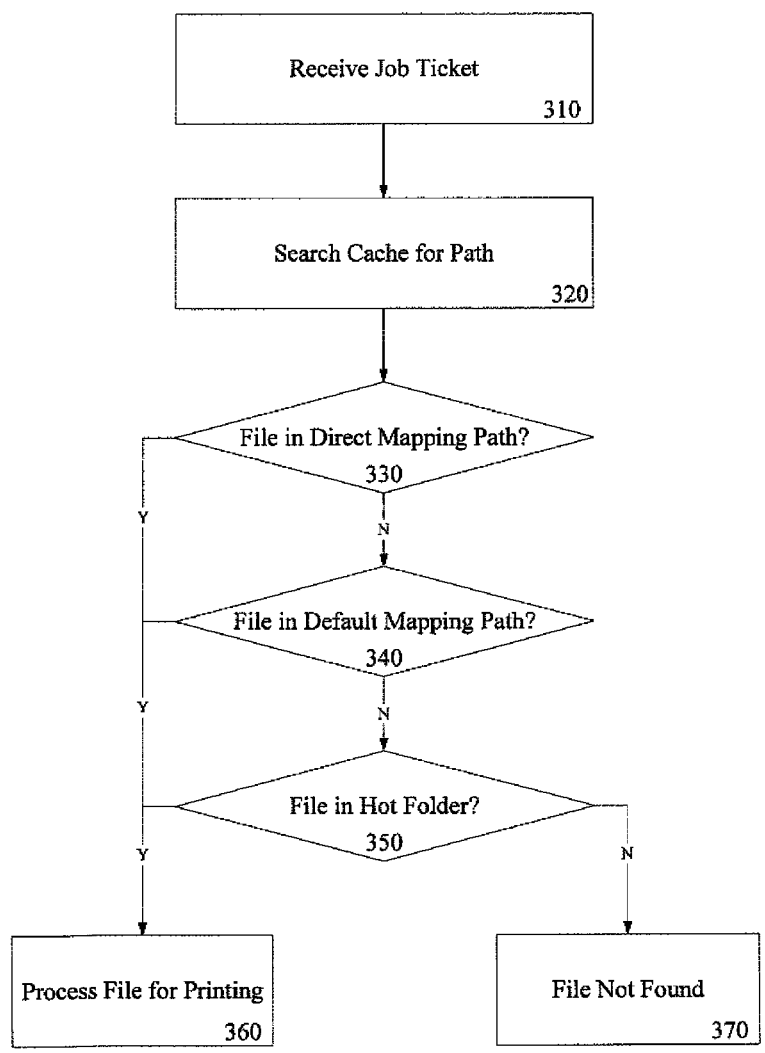
FIG. 3 is a flow diagram illustrating one embodiment of file path mapping.

FIG. 3 is a flow diagram illustrating one embodiment of file path mapping. At processing block 310, the printing software product receives a JDF job ticket specifying an absolute path location of a document file. At processing block 320, the configuration file loaded into the memory is searched for a mapping. At decision block 330, it is determined whether the document file is in a path specified by a direct mapping line entered into the configuration file by an operator.

If the document file is found in the path specified by one of several direct mapping lines, the document file is retrieved and processed by the printing software product for printing, processing block 360. Otherwise, it is determined whether the document file is in a path specified by the sample line, decision block 340. If the document file is found in the path specified by the sample line, control is returned to processing block 360 where the document file is retrieved and processed for printing.

If the document file is not found in the path specified by the sample line, it is determined whether the document file is in a hot folder location. A hot folder is a printing application that enables a document to be immediately printed upon being inserted into a folder. If the document file is found in the hot folder, control is again returned to processing block 360 where the document file is retrieved and processed for printing. However if the document file is not in the hot folder the file is not found, processing block 370. Subsequently, an error message may be provided to the operator.

Using the sample configuration file entries shown in Table 1 to illustrate operation upon receiving a JDF including the file name "C:\testfiles\test1.pdf", the printing software product would find a match for "C:\testfiles" on the left side of line 1, and substitute "/BankFiles/testfiles" from the right side of the line and first look for file /BankFiles/testfiles/test1.pdf. Subsequently, the printing software product would find a match for "*:\" and substitute "/" and check for file "/testfiles/test1.pdf". Finally, the printing software product would check the hot folder location for a file named "test1.pdf".

Using another example, the printing software product would first look for the file "/BankFiles/prod/test/justAtest.pdf" upon receiving a JDF including the file name "C:\production \siteA \test \justAtest.pdf" (e.g., the software product found a match for "C:\production \siteA" on the left side of line 2, and substituted "/BankFiles/prod" from the right side of the line). Next the printing software product would find a match for "C:\production \siteA \test" on the left side of line 3, and substitute "/BankFiles/test" from the right side and look for file /BankFiles/test/justAtest.pdf". (The same search happens for line 4 because the * would cause a match on drive C.) Next the printing software product would find a match for "*:\" on the left side of line 5, and substitute "1" from the right side and look for file "/production/siteA/test/justAtest.pdf" before checking the hot folder location for a file named "justAtest.pdf".

As yet another example, the printing software product would first look for the file "/BankFiles/test/justAtest.pdf" upon receiving a JDF including the file name "K:\production \siteA \test \justAtest.pdf (e.g., the software product found a match for "*:\production \siteA \test" on the left side of line 4, and substituted "/BankFiles/test" from the right side of the line). Then, the printing software product would find a match for "*:\" on the left side of line 5, and substitute "/" from the right side and look for file "/production/siteA/test/justAtest.pdf". Finally, it would check the hot folder location for a file named "justAtest.pdf".

Figure 4:
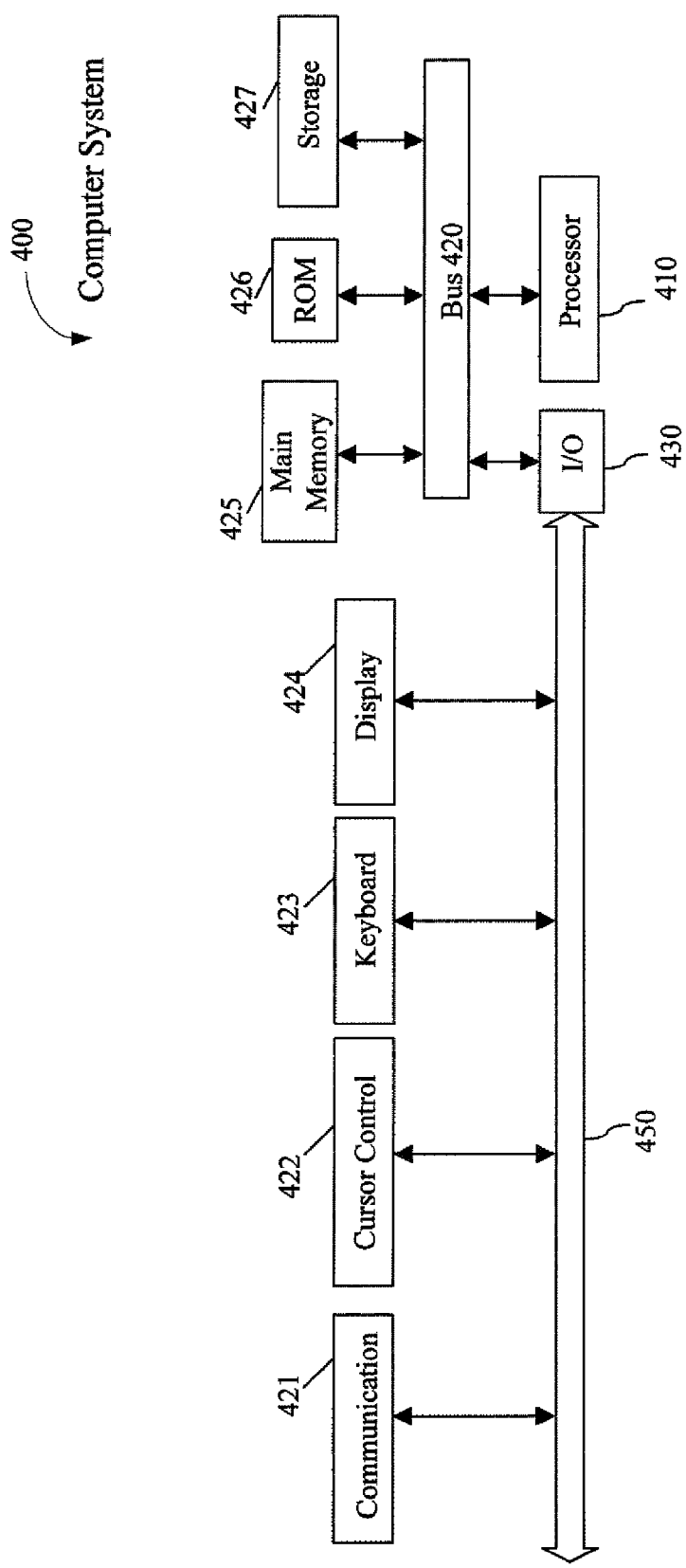
FIG. 4 illustrates one embodiment of a computer system.

FIG. 4 illustrates a computer system 400 on which data processing system 102 and/or server 108 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    receiving a Job Definition Format (JDF) job ticket indicating a document file to be printed is located in a JDF file path;
    mapping the JDF file path to a file path recognized at a print server by accessing one or more mapping lines in a configuration file;
    retrieving the document file; and
    processing the document file for printing.

2. The method of claim 1 further comprising mapping the JDF file path to a file path specified by a direct mapping line in the configuration file.

3. The method of claim 2 further comprising mapping the JDF file path to a file path specified by a sample line in the configuration file if the document file is not found in the file path specified by a direct mapping line.

4. The method of claim 3 further comprising mapping the JDF file path to a hot folder if the document file is not found in the file path specified by the sample line.

5. The method of claim 4 further comprising generating a notification that the document file cannot be found if the document file is not found in the hot folder.

6. The method of claim 1 wherein the JDF file path is a file specified in a first operating system and the file path recognized at the print server is a file specified in a second operating system.

7. The method of claim 1 further comprising:
    parsing the configuration file prior to receiving the JDF job ticket; and loading the configuration file into memory.

8. The method of claim 7 further comprising checking for updates to the configuration file at predetermined intervals.

9. The method of claim 8 wherein updates are made to the configuration file using a graphical user interface (GUI).

10. A print server comprising a processor and a printing software product to receive a Job Definition Format (JDF) job ticket indicating that a document file to be printed is located in a JDF file path,
    the printing software product having a configuration file to map the document file path to a file path recognized by the print server by parsing the configuration file and loading the configuration file into a memory after the configuration file is modified.

11. The print server of claim 10 wherein the printing software product retrieves a document file from the file path recognized by the print server and processes the document file for printing.

12. The print server of claim 11 wherein the printing software product further comprises a graphical user interface (GUI) to enable a user to modify the configuration file.

13. The print server of claim 10 further wherein the printing software product maps a JDF file path to a file path specified by a direct mapping line in the configuration file.

14. The print server of claim 13 further wherein the printing software product maps the JDF file path to a file path specified by a sample line in the configuration file if the document file is not found in the file path specified by a direct mapping line, and maps the JDF file path to a hot folder if the document file is not found in the file path specified by the sample line.

15. An article of manufacture comprising a non-transitory machine-readable medium including data that, when accessed by a machine, cause the machine to perform operations comprising: receiving a Job Definition Format (JDF) job ticket indicating a document file to be printed is located in a JDF file path;
mapping the JDF file path to a file path recognized at a print server by accessing one or more mapping lines in a configuration file;
retrieving the document file; and
processing the document file for printing.

16. The article of manufacture of claim 15 when accessed by the machine, further cause the machine to perform operations comprising mapping the JDF file path to a file path specified by a direct mapping line in the configuration file.

17. The article of manufacture of claim 16 when accessed by the machine, further cause the machine to perform operations comprising mapping the JDF file path to a file path specified by a sample line in the configuration file if the document file is not found in the file path specified by a direct mapping line.

18. The article of manufacture of claim 17 when accessed by the machine, further cause the machine to perform operations comprising mapping the JDF file path to a hot folder if the document file is not found in the file path specified by the sample line.

* * * * *